United States Patent [19]
Ensz et al.

[11] Patent Number: 5,957,477
[45] Date of Patent: Sep. 28, 1999

[54] SELF-LOCKING TELESCOPING TOWING ARM

[75] Inventors: Russell M. Ensz, Matlock; Brent G. Mulder, Boyden, both of Iowa

[73] Assignee: Dethmers Manufacturing Company, Boyden, Iowa

[21] Appl. No.: 08/600,503

[22] Filed: Feb. 13, 1996

[51] Int. Cl.⁶ .................................................. B60D 1/167
[52] U.S. Cl. ........................ 280/482; 280/491.2; 403/109; 403/325; 403/328
[58] Field of Search ................................ 280/482, 491.2, 280/491.4, 491.5, 456.1; 403/325, 328, 109

[56] References Cited

U.S. PATENT DOCUMENTS

| | | | |
|---|---|---|---|
| 2,120,422 | 6/1938 | Williams et al. | 280/33.44 |
| 3,147,027 | 9/1964 | Bronleewe | 280/491.4 |
| 3,260,541 | 7/1966 | Sadler et al. | |
| 3,834,737 | 9/1974 | Elkins . | |
| 3,969,033 | 7/1976 | Recker | 403/325 |
| 4,198,080 | 4/1980 | Carpenter . | |
| 4,577,883 | 3/1986 | Duncan . | |
| 4,645,372 | 2/1987 | Suzuki . | |
| 4,768,803 | 9/1988 | Hewitt et al. | |
| 4,856,805 | 8/1989 | Davis . | |
| 4,861,061 | 8/1989 | Frantz | 280/479.2 |
| 4,957,387 | 9/1990 | Nasu . | |
| 4,960,344 | 10/1990 | Geisthoff et al. | |
| 5,070,620 | 12/1991 | Crain et al. | 403/109 |
| 5,071,153 | 12/1991 | Duncan . | |
| 5,083,883 | 1/1992 | Ueda et al. | 403/325 |
| 5,141,355 | 8/1992 | Stillwagon . | |
| 5,147,095 | 9/1992 | Duncan . | |
| 5,224,960 | 7/1993 | Duncan . | |
| 5,339,916 | 8/1994 | Louis | 403/325 |
| 5,356,166 | 10/1994 | Hahne et al. | |
| 5,516,140 | 5/1996 | Hinte | 280/494 |
| 5,632,568 | 5/1997 | Fetcher | 403/328 |

FOREIGN PATENT DOCUMENTS

| | | |
|---|---|---|
| 844457 | 6/1970 | Canada . |
| 1171112 | 7/1984 | Canada . |
| 482551 | 8/1975 | Russian Federation . |
| 2237545 | 5/1991 | United Kingdom ................ 280/491.2 |

OTHER PUBLICATIONS

The Rangefinder II Tow Bar, A test of the next generation of Blue Ox towing equipment, Family Motor Coaching, pp. 50 and 52 (no date available).

Rangefinder II, New self–aligning tow bar eases the task of hitching a towed vehicle, MotorHome, pp. 77–78, Mar. 1993.

1993 Automatic Equipment Mfg. Co. TowBars brochure.

1994 Automatic Equipment Mfg. Co. Aventa brochure.

O.E.M. Product Guide, Weasler Engineering, Inc. of West Bend, Wisconsin, No. W–00–3–85–rev (on back cover), at pp. 54 and 66.

KARBAR brochure. No Ball Mount. No Storage Hassles. No Problem!, Automatic Equipment Manufacturing Company. Oct. 1995.

(List continued on next page.)

*Primary Examiner*—Anne Marie Boehler
*Attorney, Agent, or Firm*—Brian J. Laurenzo; Michael C. Gilchrist

[57] ABSTRACT

A towing arm is provided for use in a tow bar assembly that connects a towed vehicle to a towing vehicle. The towing arm has an inner leg and an outer leg so that it can move telescopically between a collapsed position which is suitable for storage and an extended position for towing. When connected between a towing vehicle and a towed vehicle, the towing arm will automatically lock in the extended position as the towing vehicle is pulled away from the towed vehicle. The locking feature is accomplished by a slideable collar that moves between a locked position and a released position. When in the locked position, the collar holds catches in place between the outer leg and grooves in the inner leg, thereby locking the legs in fixed relation to each other. When in the collar is moved to the released position, the legs are free to telescope relative to each other. The catches have saddle-shaped surfaces to fit the contours of the grooves. The grooves only partially encircle the inner leg.

12 Claims, 13 Drawing Sheets

OTHER PUBLICATIONS

Blue Ox Operator, Parts and Installation Manual, BX8433 HUMMER Tow Bar, Automatic Towing Products Division. Feb. 1995.

Duncan Operator, Parts and Installation Manual, DM1002 EazAligner 2000 Tow Bar, Automatic Towing Division, Sep. 1994.

Technical Information and Drawings related to Compleat Tow Bar by J. Peter Morris, Feb. 28, 1990.

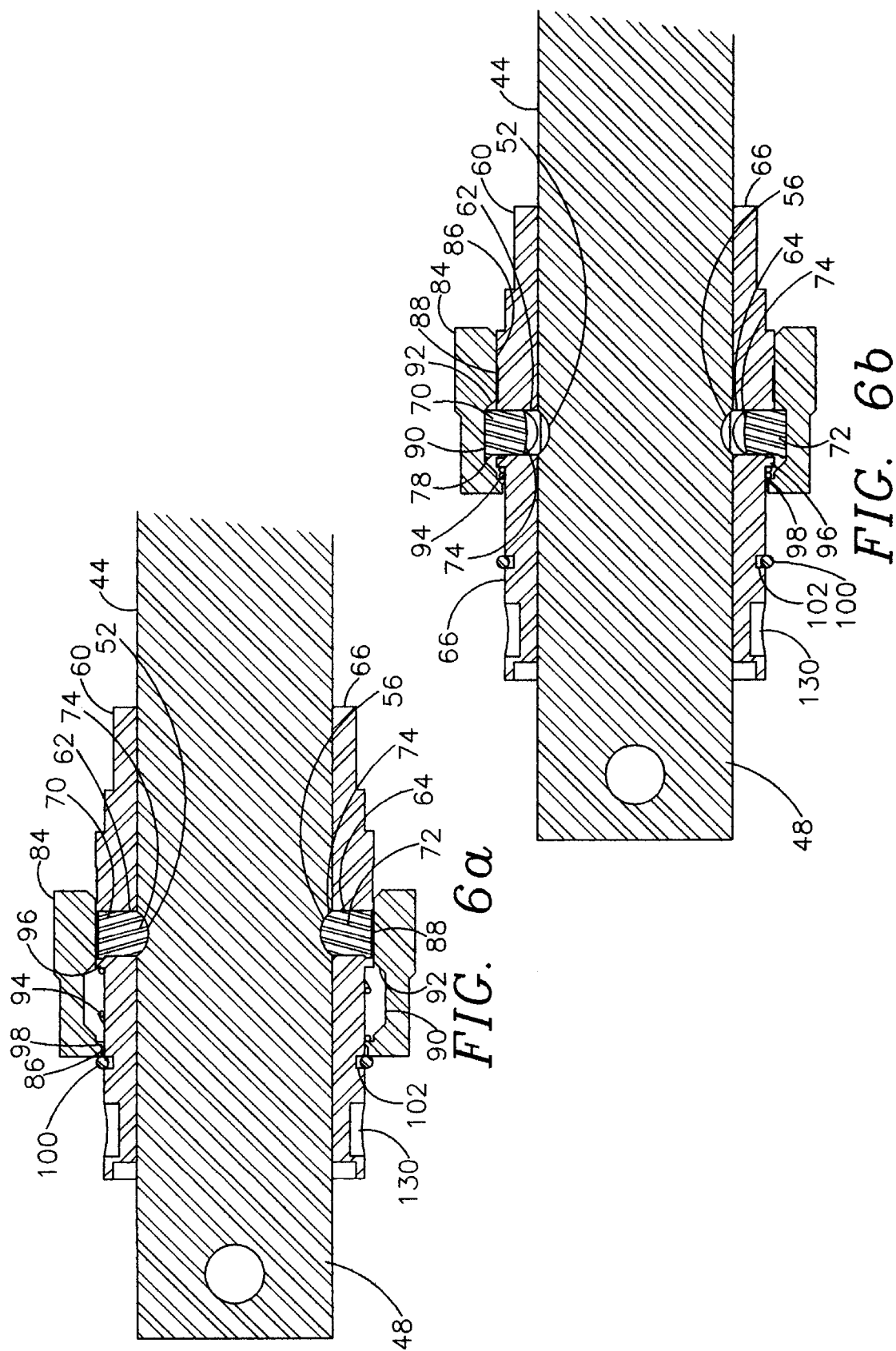

SELF-LOCKING TELESCOPING TOWING ARM

BACKGROUND OF INVENTION

The invention relates generally to hitching members for connecting a towed vehicle with a towing vehicle, and more particularly to an improved self-locking telescoping towing arm for use as part of a tow bar assembly.

Tow bar assemblies for use as hitching members are common in the art. These assemblies generally use two towing arms which are coupled between a towing vehicle and a towed vehicle. It is desirable to be able to store tow bar assembly. To this end, tow bar assemblies with collapsible arms have been suggested. This allows the towing arms to fit in a smaller space when not in use. Therefore, these towing arms are generally movable between a collapsed storage position, and an extended towing position. They must be provided with some means for locking the arms in the extended position to hold the towed vehicle at a substantially constant distance from the towing vehicle during towing.

It has been shown in the prior art to use a telescoping towing arm having an inner leg and an outer leg in a tow bar assembly, as for example in U.S. Pat. No. 5,356,166, in order to accomplish the collapsible feature of the towing arms to allow for storage. However, the prior art telescoping towing arms have utilized locking mechanisms with spherical catches and a groove that entirely encircles the inner leg of the telescoping arm. Because the groove completely encircles the inner leg, it can weaken the inner leg significantly. Obviously a stronger leg is desired over a weaker leg because of the danger and expense involved if a towing leg should break.

Often it is necessary, or at least recommended, to disassemble the towing arms for routine cleaning or lubricating of the parts. It may also be necessary to disassemble the towing arms to inspect the parts or to replace any damaged parts. For this reason, towing arms that can be disassembled and reassembled easily are desirable.

Because the spherical catches contact only a small portion of the groove, several catches are needed in order to lock the arms securely in the extended position. This leads to increased manufacturing and assembly costs. Because there are several spherical catches, they are difficult to keep track of during disassembly for maintenance. Furthermore, because of their shape they tend to roll away if dropped on the floor.

The difficulties encountered in the prior art and discussed above are substantially eliminated by the present invention.

SUMMARY OF THE INVENTION

Accordingly, it is an object of the present invention to provide a durable and easy to use towing arm for use in a tow bar assembly that is extensible to an extended position to be used in towing a towed vehicle behind a towing vehicle, and collapsible to a collapsed position to be used for storing the tow bar assembly.

It is a further object of the present invention to provide a telescoping towing arm that will automatically lock into an extended towing position when attached between a towing vehicle and a towed vehicle, as the towing vehicle pulls away from the towed vehicle.

It is another object of the present invention to provide a self-locking telescoping towing arm with increased durability.

It is a further object of the present invention to provide a self-locking telescoping tow arm wherein the catch which holds the towing arm in an extended position has greater contact with the groove than a spherical catch.

It is yet another object of the present invention is to provide a self-locking telescoping tow arm which is convenient to assemble and disassemble.

These and other objects will become apparent upon reference to the following specification, drawings, and claims.

By the present invention, it is proposed to meet these objectives and other more specific objectives which will become apparent as the description proceeds. To this end, a self-locking telescoping towing arm for use in a tow bar assembly is proposed. The towing arm comprises a first leg and a second leg telescopically connected with the first leg. An opening is provided in the first leg. A catch, having a saddle-shaped surface, is provided through the opening in the first leg. A groove, which only partially encircles the second leg, is provided in the second leg to receive the catch in order to lock the towing arm in an extended position. A slideable collar is provided about the first leg, and is movable between a locked position and a released position. When the collar is in the locked position and the opening in the first leg is aligned with the groove in the second leg, the collar maintains the saddle-shaped surface of the catch in engagement with the groove to hold the second leg fixed relative to the first leg in the extended position. When the collar is in the released position, the catch is releasable from engagement with the groove so that the second leg can move telescopically relative to the first leg. Means are provided to urge the collar into the locked position. In a preferred embodiment a second groove is provided to allow the towing arm to be locked in a collapsed position.

BRIEF DESCRIPTION OF THE DRAWINGS

FIG. 6a is a cross-sectional plan view of the towing arm of FIG. 4a showing a towing arm in the collapsed position with the collar in the locked position;

FIG. 6b is a cross-sectional plan view of the towing arm of FIG. 4b showing a towing arm with the collar in the released position;

DETAILED DESCRIPTION OF PREFERRED EMBODIMENTS

Figure 1:
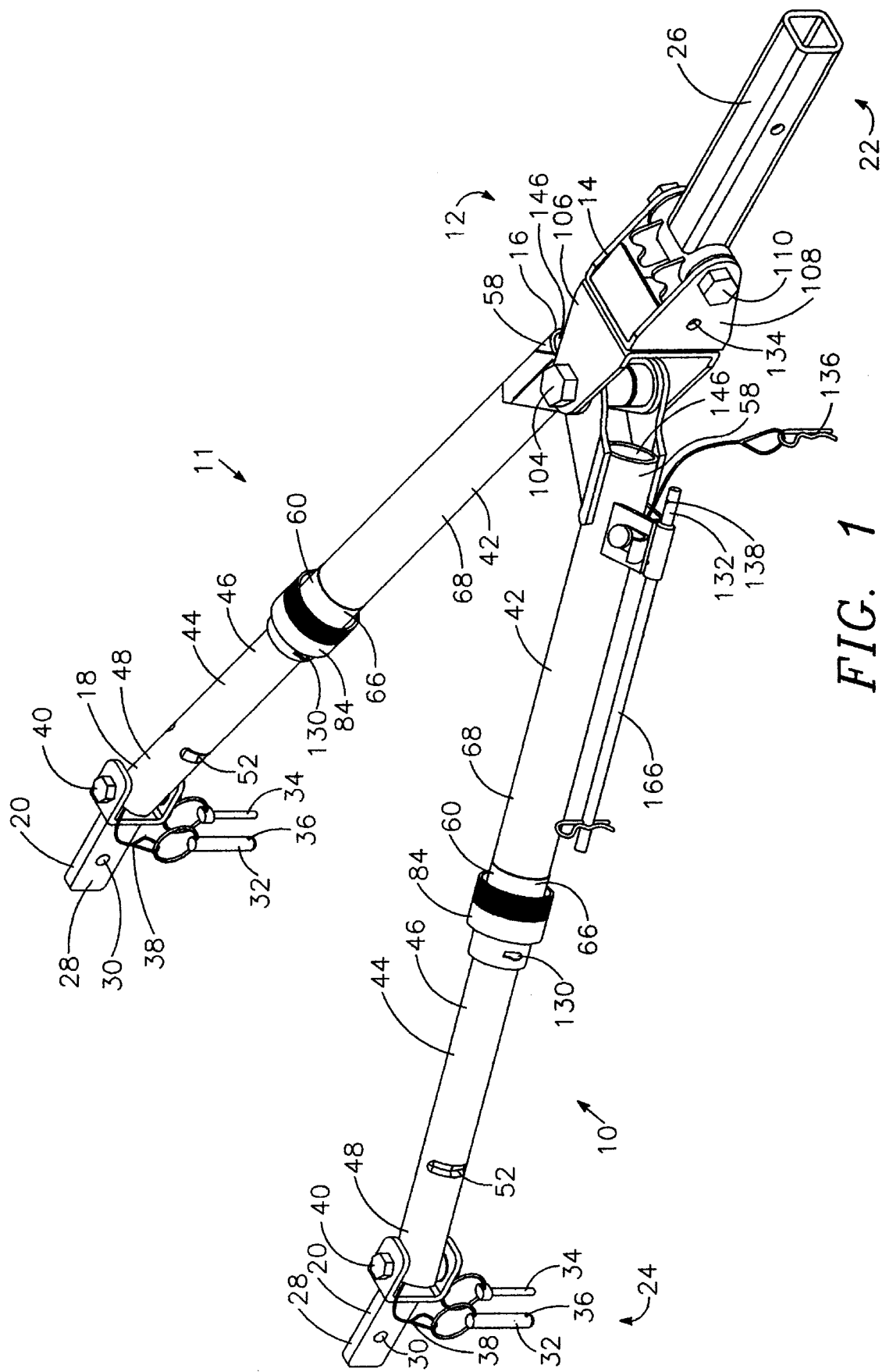
FIG. 1 is a perspective view of a tow bar assembly including an embodiment of the towing arm of the present invention.

Shown generally in the drawings, and particularly with reference to FIG. 1, is a tow bar assembly 12 which uses a first towing arm 10 and a second towing arm 11. A first end 16 of each towing arms 10, 11 is connected to a coupling 14 which is suitable for attachment to a towing vehicle 148. A second end 18 of each towing arm 10, 11 is attached to a clevis 20 suitable for operable attachment to a towed vehicle 150. The tow bar assembly 12 therefore has a towing vehicle end 22 and a towed vehicle end 24. Describing the embodiment shown in FIG. 1, and beginning at the towed vehicle end 24, the tow bar assembly 12 is made up of the devises 20 which are bolted to the two towing arms 10, 11 the towing arms 10 are pivotally connected to the coupling 14, which is in turn pivotally connected to a male receiver bar 26 which attaches to the towing vehicle 148 at the towing vehicle end 22 of the tow bar assembly 12.

It should be understood that the first towing arm 10 and the second towing arm 11 of the preferred embodiment are identical. Therefore, except as noted, the following description applies to both towing arms 10, 11. Each clevis 20 has a tongue 28 which extends away from the towing arm 10 to which it is attached. The tongue is provided with an aperture 30 for releaseably attaching the tow bar assembly 12 to a towed vehicle 150. An attaching dowel 32 is inserted through the aperture 30 and a corresponding hole (not shown) at the front of the towed vehicle 150, and is held in place by an attaching pin 34 inserted through a passageway 36 in the attaching dowel 32. The attaching dowel and attaching pin 34 are conveniently retained at the towed vehicle end 24 of the tow bar assembly 12 by a retaining wire 38. A clevis bolt 40 pivotally connects the clevis 20 to the towing arm 10 so that the towing arm 10 may be attached to the towed vehicle 150 at a variety of angles.

Figure 12A:
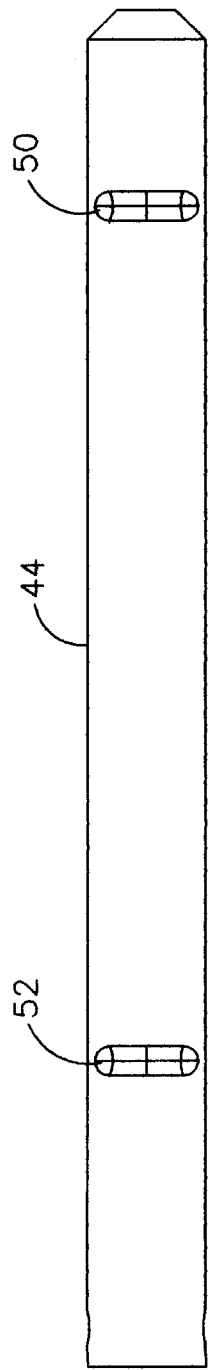
FIGS. 12a–c are details showing the second leg of a the tow bar assembly of FIG. 1.
Figure 12B:
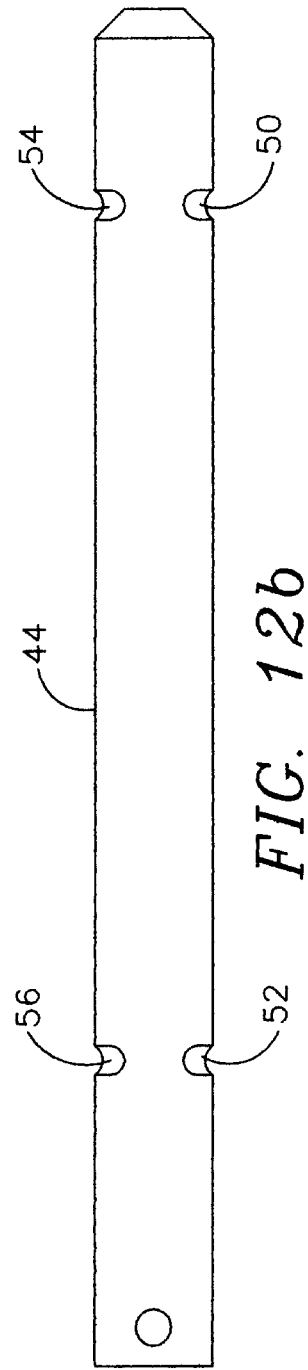
Figure 12C:
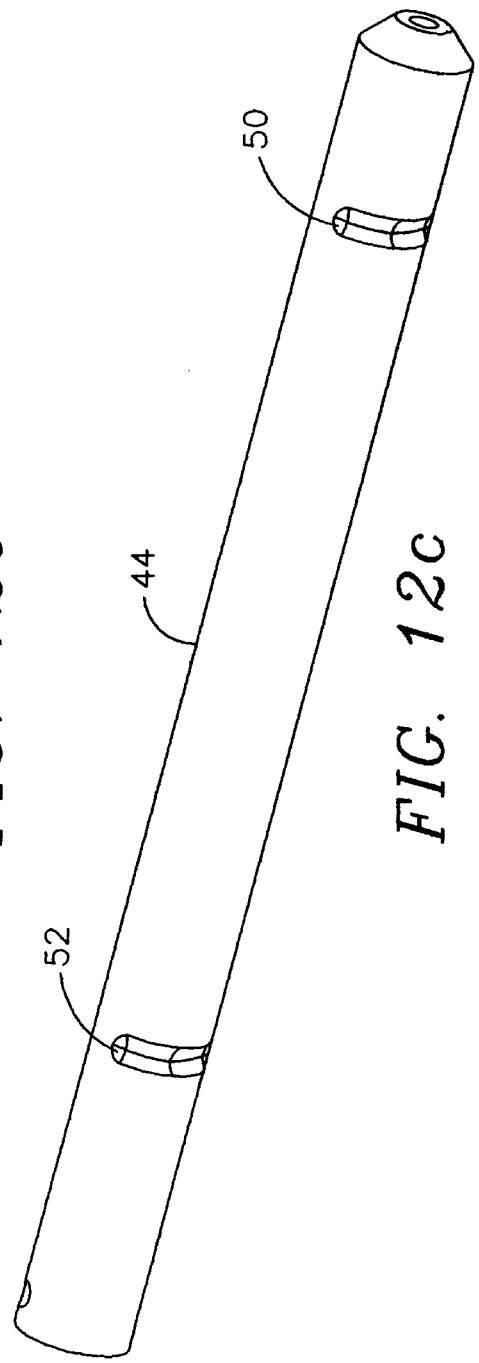

The towing arm 10 has a first leg 42 and a second leg 44. As best seen in FIGS. 12a–c, the second leg 44 of the preferred embodiment is basically an elongated circular bar. The second leg 44 has a first end section 46 and a second end section 48. A first 50, second 52, third 54, and fourth 56 groove are provided in the second leg 44. Importantly, none of these grooves 50, 52, 54, 56 completely encircles the second leg 44; therefore, the second leg 44 is weakened less by the grooves 50, 52, 54, 56 than if they encircled the second leg 44. The second leg 44 may be constructed of a solid bar, or a thick-walled tube. A solid bar is believed to be preferable as it will allow improved machining of the grooves 50, 52, 54, 56.

Figure 11:
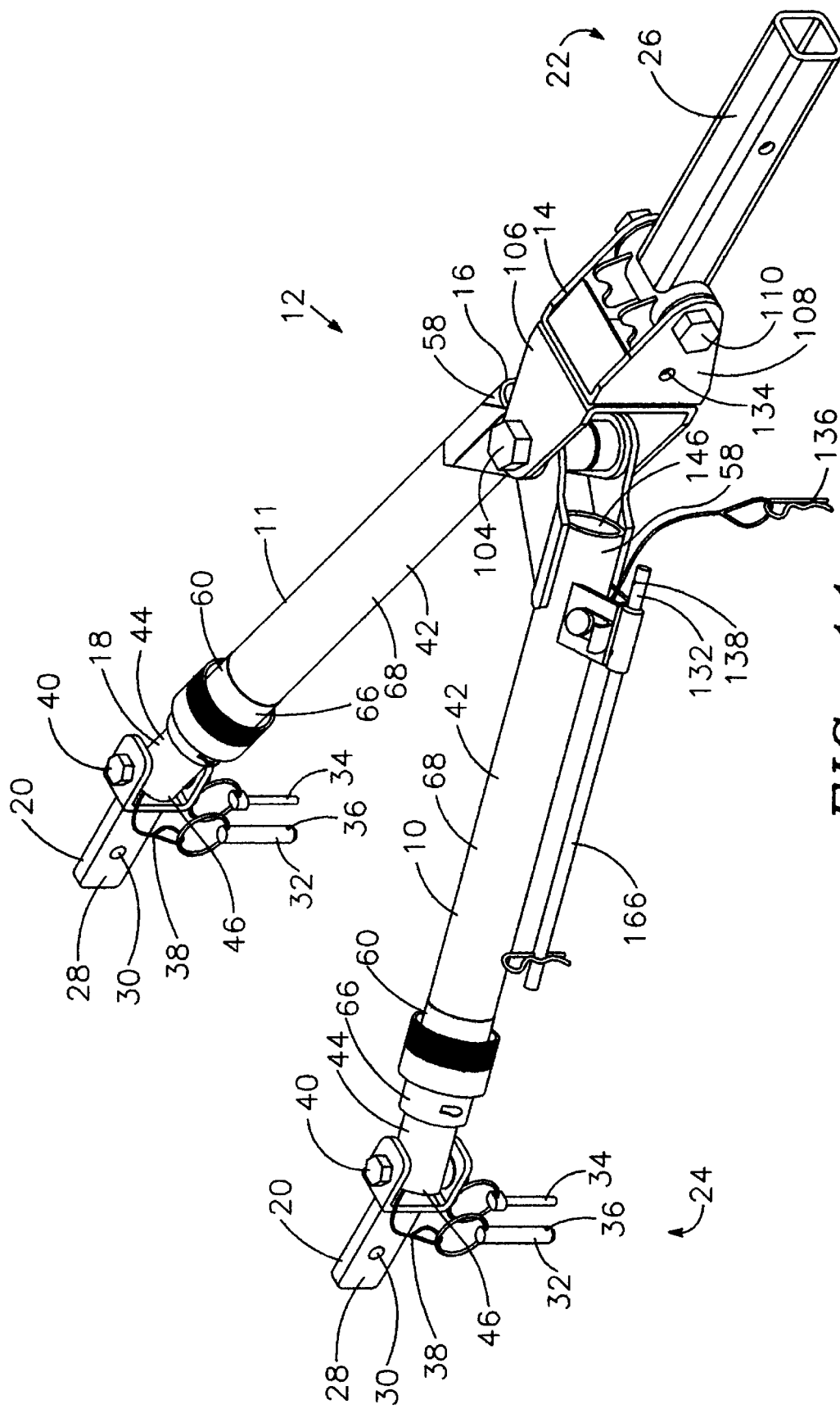
FIG. 11 is a perspective view of the tow bar assembly of FIG. 1 with the towing arms in a collapsed position.

The first groove 50 is located in the first end section 46 of the second leg 44. The third groove 54 is also located in the first end section 46 of the second leg 44, diametrically opposite from the first groove 50. The first and third grooves 50, 54 are used in locking the towing arm 10 in an extended position for towing. The second and fourth grooves 52, 56 are located in the second end section 48 of the second leg 44, diametrically opposite from each other. The second and fourth grooves 52, 56 are used for locking the towing arm 10 in a collapsed position (FIG. 11) for storage. It is contemplated that means other than the second and fourth grooves 52, 56 may be used to retain the tow bar assembly 12 in the collapsed position. For example, a cover (not shown) placed over the tow bar assembly 12 may be sufficient to hold the assembly 12 in the collapsed position for storage while also protecting the tow bar assembly 12 from the elements.

Figure 2:
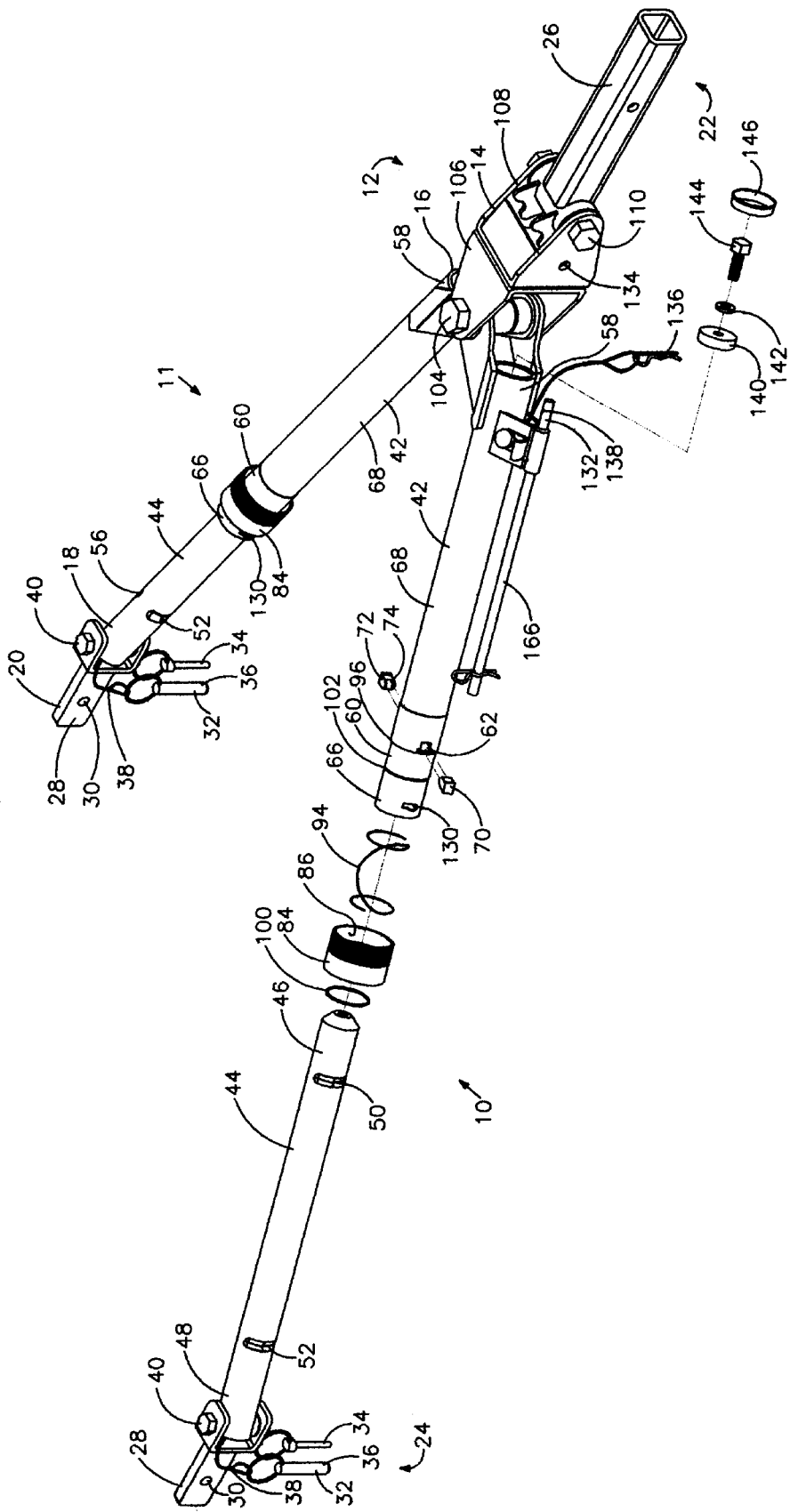
FIG. 2 is an exploded perspective view of the tow bar assembly of FIG. 1.

Again, with reference to FIG. 2, the first leg 42 of the preferred embodiment is a circular tube having an inner diameter greater than the outer diameter of the second leg 44, so that the second leg 44 can fit telescopically within the first leg 42. The first leg 42 has a first end section 58 and a second end section 60 opposite from the first end section 58. A first 62 and second 64 opening (FIGS. 6a, 6b) are provided in the second end section 60 of the first leg 42, diametrically opposite from each other so that the grooves 50, 52, 54, 56 in the second leg 44 can be aligned with the openings 62, 64 in the first leg 42. The first opening 62 can be aligned with the first and second grooves 50, 52, and the second opening 64 can be aligned with the third and fourth grooves 54, 56. In the preferred embodiment, the second end section 60 is a machined spud 66 (FIG. 3) that welds on to a hollow tube 68 that forms the first end section 58 of the first leg 42.

In the preferred embodiment shown in FIG. 1, the first end section 58 of the first leg 42 of one of the towing arms 10 has a wire support 166 attached. This wire support 166 is used as a spool to hold the lighting cable (not shown) during storage. The lighting cable is commonly used to connect the turn signal and brake light controls of the towing vehicle 148 to the turn signals and brake lights of the towed vehicle 150. The wire support 166 will also hold any excess cable during towing.

The second leg 44 is prevented from sliding out of the first leg 42 by a stop washer 140 fastened to the first end section 46 of the second leg 44 by a lockwasher 142 a bolt 144 (FIG. 2). The stop washer 140 is larger in diameter than an orifice (not shown) in the second end section 60 of the first leg 42, thereby preventing the first end section 46 of the second leg 44 from sliding past the orifice. An end cap 146 is provided for the first end section 58 of the first leg 42 to prevent water and other fouling agents from getting into the first leg 42.

Figure 3:
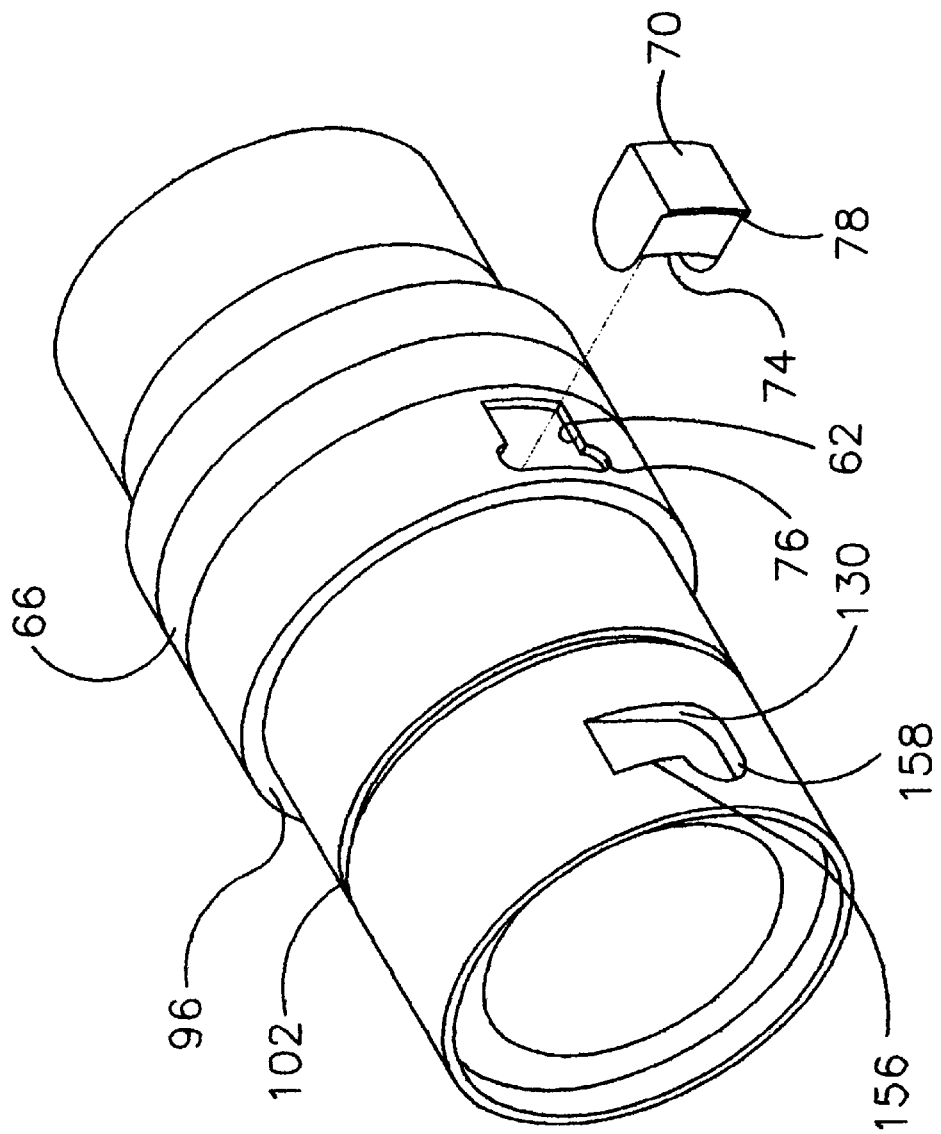
FIG. 3 is a perspective view of a machined spud and catch of one of the towing arms of FIG. 1.
Figure 5:
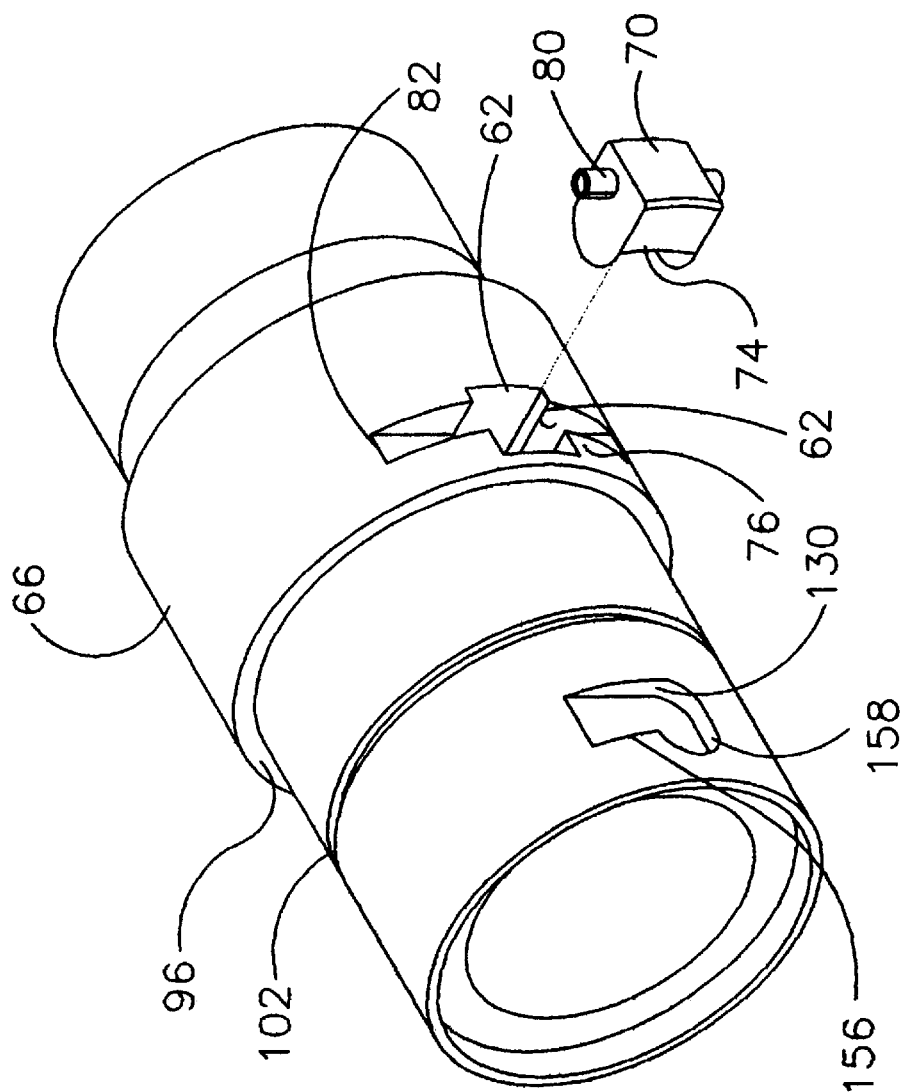
FIG. 5 is a detail perspective view of an alternative embodiment of a machined spud and catch of a towing arm wherein the catch has a transverse rod.
Figure 9A:
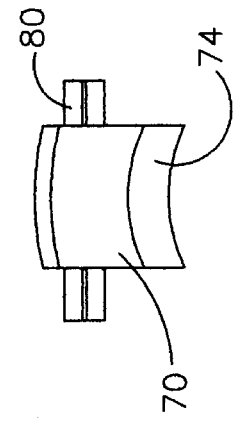
FIGS. 9a–c are detail views of the catch shown in FIG. 5.
Figure 9B:
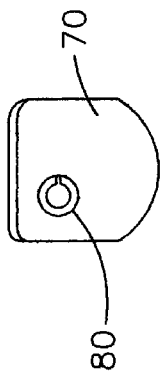
Figure 9C:
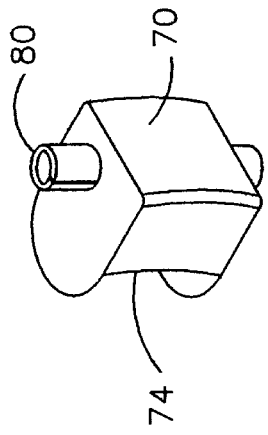
Figure 8A:
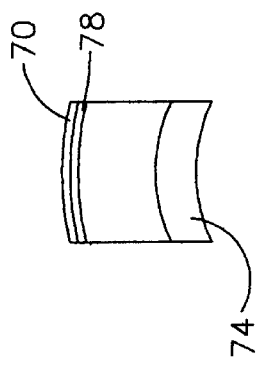
FIGS. 8a–c are detail views showing the catch of FIG. 3.
Figure 8B:
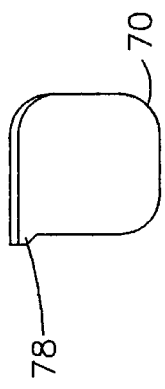
Figure 8C:
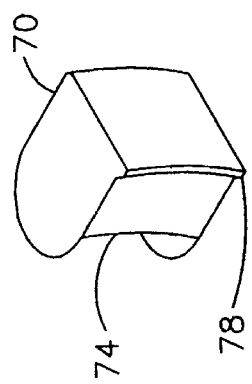

A first 70 and a second 72 catch are provided that will fit at least partially through the first and second openings 62, 64 respectively. The catches 70, 72 each have a saddle-shaped surface 74 to match the contours of the grooves 50, 52, 54, 56. This saddle-shaped surface 74 allows maximum contact area between the catches 70, 72 and the grooves 50, 52, 54, 56. Some means needs to be provided to prevent the catches 70, 72 from passing completely through the first leg 42. In the preferred embodiment notch 76 is machined part way through the spud 66 adjoining each of the openings 62, 64 (FIG. 3). A lip 78 on the catches 70, 72 engages the notch 76 (FIGS. 8a–c). A preferred embodiment of the catch 70, 72 with the lip 78 is available from Weasler Engineering Inc., Box 558 West Bend, Ind., as part number 33-11016. In an alternative embodiment, a transverse rod 80 is provided through the catches 70, 72 (FIGS. 9a–c). The rod 80 is wider than the openings 62, 64, thereby preventing the catches 70, 72 from passing through the openings 62, 64. A slot 82 is machined part way through the spud 66 to allow the transverse rod 80 to pass part way, but not all the way, through the first leg 42 (FIG. 5). A version of the catch 70, 72 of the alternative embodiment having the transverse rod 80 is also available from Weasler Engineering as part number 33-10014.

Figure 4:
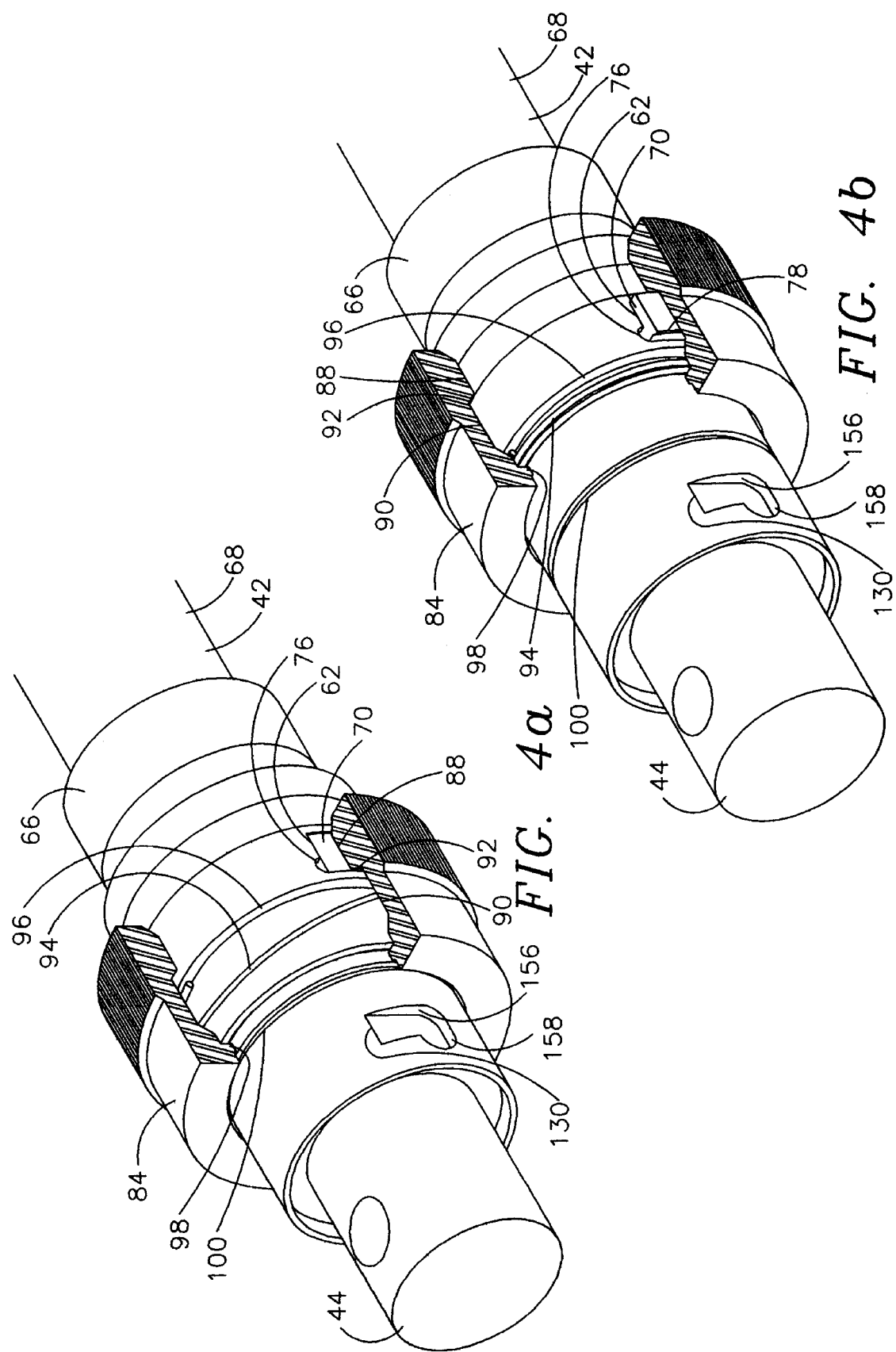
FIG. 4a is a detail perspective illustrating a towing arm in the collapsed position with the collar in a locked position.
FIG. 4b is a detail perspective of the towing arm of FIG. 4a with the collar moved to a released position.

A collar 84 slides over the spud 66 to control the position of the catches 70, 72. The collar slides between a locked position and a released position. When the collar 84 is in the locked position (FIG. 4a), it presses the catches 70, 72 inward toward the second leg 44 so that the saddle-shaped surfaces 74 are in engagement any of the grooves 50, 52, 54, 56 that are in alignment with the respective openings 62, 64. When the collar 84 is in the released position (FIG. 4b), the catches 70, 72 are allowed to move outwardly, away from the second leg 44, so that the saddle-shaped surfaces 74 disengage from the grooves 50, 52, 54, 56 and the second leg 44 is free to move telescopically relative to the first leg 42.

The collar 84 of the preferred embodiment is made of metal and has a machined inner surface 86 specially shaped to perform the locking and releasing functions. Specifically, the inner surface 86 has a ledge area 88 wherein the inner surface 86 has a reduced diameter, a recessed area 90 wherein the inner surface 86 has a relatively larger diameter, and a ramp area 92 wherein the diameter of the inner surface 86 slopes from the ledge area-88 to the recessed area 90.

When the collar 84 is in the locked position (FIG. 6a), the ledge area 88 is aligned with the openings 62, 64 and the catches 70, 72 are forced inward through the openings 62, 64 toward the second leg 44 by the ledge area 88. This locked position is only possible when the openings 62, 64 are aligned with one of the pairs of grooves (the first and third grooves 50, 54 to lock the towing arm 10 in the extended position, the second and fourth grooves 52, 56 to lock the towing arm 10 in the collapsed position). When the collar 84 is in the locked position, the ledge area 88 presses the against the catches 70, 72 thereby holding the saddle-shaped surfaces 74 of the catches 70, 72 against their respective grooves 50, 52, 54, 56. Because the catches 70, 72 are pressed into the grooves 50, 52, 54, 56, the second leg 44 cannot telescope relative to the first leg 42, and the legs 42, 44 are locked in a fixed relationship to each other.

When the collar 84 is in the released position (FIG. 6b), the recessed area 90 of the collar 84 is aligned with the openings 62, 64, and the catches 70, 72 are free to move outwardly away from the second leg 44. The catches 70, 72 will not be forced away from the grooves 50, 52, 54, 56, and may remain in contact with the grooves 50, 52, 54, 56; however, if force is applied to move the second leg 44 telescopically relative to the first leg 42, the grooves 50, 52, 54, 56 will press against the catches 70, 72 tending to force the catches 70, 72 outward until they are moved back into the recessed area 90 and the legs 42, 44 are free to telescope relative to each other.

A spring 94 is used to bias the collar 84 toward the locked position. The spring 94 is positioned between a spring-retaining ridge 96 on the outside of the spud 66, and a spring-retaining lip 98 on the collar 84. The collar 84 is oriented so that the recessed area 90 of the collar 84 is on the towed-vehicle side of the ledge area 88 of the collar 84. Therefore, the spring-retaining ridge 96 is on the towing-vehicle side of the spring-retaining lip 98 so that the spring 94 tends to urge the collar 84 away from the towing vehicle 148 to the locked position wherein the ledge area 88 of the collar 84 is aligned with the openings 62, 64. Some means is needed to prevent the collar 84 from sliding too far away from the towing vehicle 148 so that the ledge area 88 slides past the openings 62, 64. In the preferred embodiment a snap ring 100 fits in a snap-ring slot 102 machined in the spud 66. When the snap ring 100 is placed in the snap-ring slot 102, the collar 84 is prevented from sliding toward the towed vehicle 150 so far that the ledge area 88 of the inner surface 86 of the collar 84 is no longer aligned with the openings 62, 64.

The spring 94 makes the towing arm 10 self-locking. When the second leg 44 is moved so that its first and third grooves 50, 54 are aligned with the openings 62, 64, the collar 84 will be moved to the locked position automatically by the spring 94. As the collar 84 moves toward the locked position, the ramp area 92 of the inner surface 86 of the collar 84 forces the catches 70, 72 inward so that the saddle-shaped surfaces 74 engage the first and third grooves 50, 54. The sloped quality of the ramp area 92 is necessary to prevent the collar 84 from sticking on the catches 70, 72 without forcing them inward as the collar 84 moves from the released position to the locked position. Once the collar 84 reaches the locked position, the catches 70, 72 will be held in the grooves 50, 54 by the ledge area 88.

Looking again at FIG. 1, it can be seen that the first end 16 of the towing arms 10, 11 are pivotally connected to each other and the coupling 14 by a horizontal pivot bolt 104 that allows pivot of the towing arms 10, 11 in a substantially horizontal plane when the tow bar assembly 12 is in connection between a towing vehicle 148 and a towed vehicle 150. The preferred coupling 14 is described in a pending application, Ser. No. 08/285,224. The coupling 14 has two yokes 106, 108 placed back-to-back. The first yoke 106 is pivotally connected to the towing arms 10, 11 by the horizontal pivot bolt 104, and swivelly connected with the second yoke 108. The second yoke 108 is pivotally connected to the male receiver bar 26 by a vertical pivot bolt 110. The vertical pivot bolt 110 allows for changes in elevation of the towed vehicle 150 relative to the towing vehicle 148 when the tow bar assembly 12 is in connection between the towing vehicle 148 and the towed vehicle 150. The male receiver bar 26 is a square tube which is received and locked into place in a female receiving tube (not shown) at the rear of the towing vehicle 148. Other standard means may be used to affix the coupling 14 to the towing vehicle 148.

In the preferred embodiment, a release tool 112 may be used to move the collar 84 from the locked position to the released position. The release tool 112 provides a mechanical advantage to make moving the collar 84 easier and more comfortable for the user. Stress can build up between the catches 70, 72 and inner surface 86 of the collar 84 when the collar 84 is in the locked position during towing or if the towed vehicle 150 is not perfectly aligned with the towing vehicle 148. This can make it difficult or impossible to move the collar 84 by hand. Therefore, the release tool 112 allows for easier movement of the collar into the released position when it would otherwise be difficult or impossible.

The release tool 112 is formed by an elongated handle 114 with a stirrup 116 extending from a first end 152 of the handle 114. The handle 114 has a second end 164 opposite from the first end 152. The second end 164 is unattached. The handle 114 may be covered with padding, or a rubberized grip, for comfort and improved tackiness. The stirrup 116 is formed by a first ear 118 and a second ear 120 on opposite sides of the first end 152 of the handle 114. The second ear 120 is a mirror image of the first ear 118. Each ear has an inside surface 160 that faces the other ear, and an outside surface 162 opposing the inside surface 160. At an end opposite from the handle 114, each ear 118, 120 has a fulcrum peg 124 extending from its inside surface 160. While it is contemplated to drill a hole in each ear 118, 120 through which rivets can be inserted and held in place with weldments, to serve as the fulcrum pegs 124, other means can be used to accomplish the purpose of providing a fulcrum point about which the release tool 112 can be pivoted. A cam surface 122 is provided on each ear 118, 120. Each cam surface 122 is convex in shape and located along a curved edge 154 of each ear 118, 120.

The spud 66 has a pair of peg-receiving notches 130 for receiving the fulcrum pegs 124. Each peg-receiving notch 130 has a channel 156 and a slot 158. The channels 156 are open along the top of the first leg 42 and closed at the opposite end of the channel 156, and are oriented so that they are vertical when the towing arms 10, 11 are extended horizontally for towing. The slots 158 extend from the bottom of the channels 156, parallel to the first leg 42, away from the collar 84.

Figure 7A:
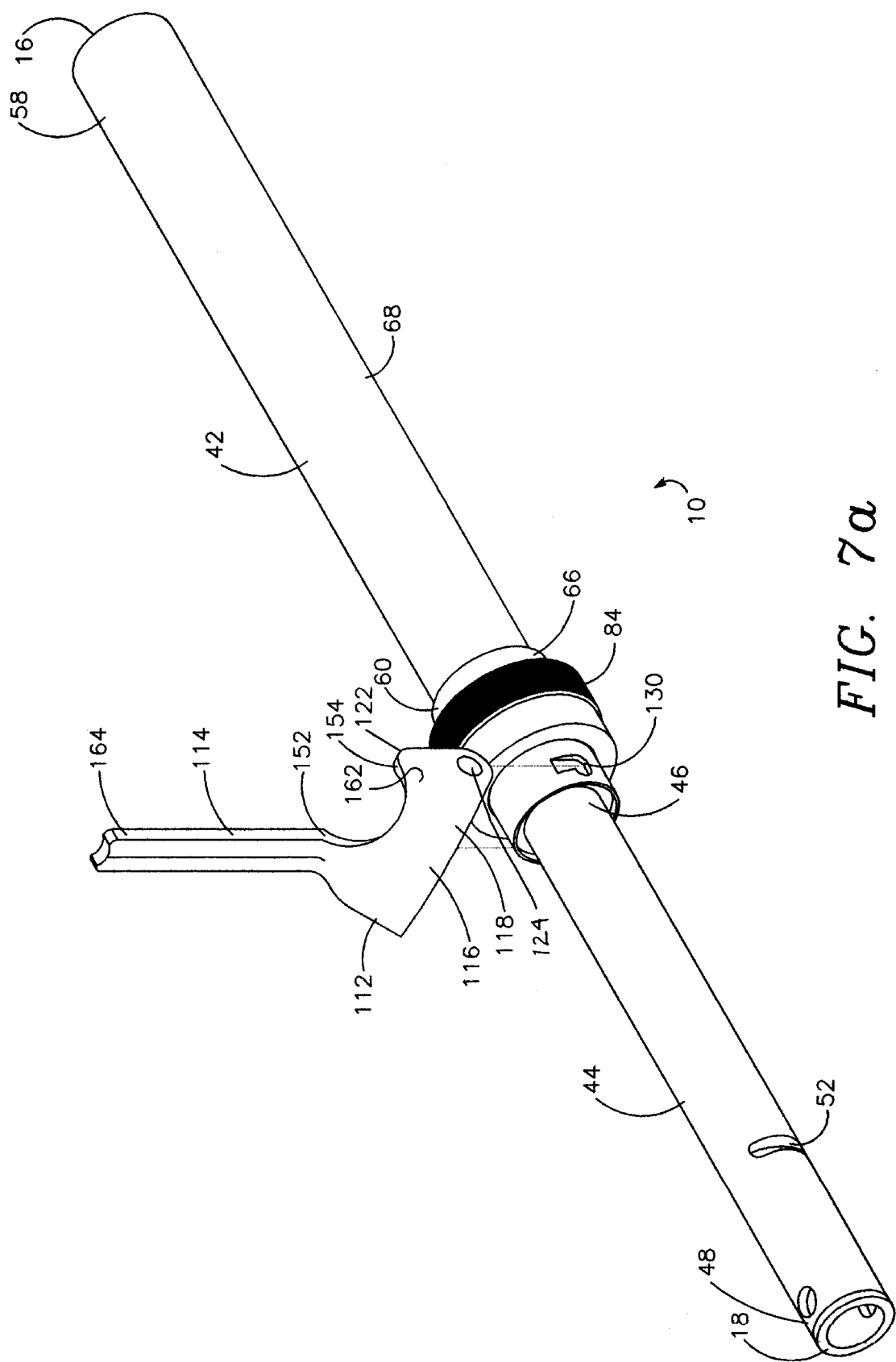
FIGS. 7a–c are perspectives of the towing arm of FIG. 1 illustrating the use of a release tool to move the collar to a release position.
Figure 7B:
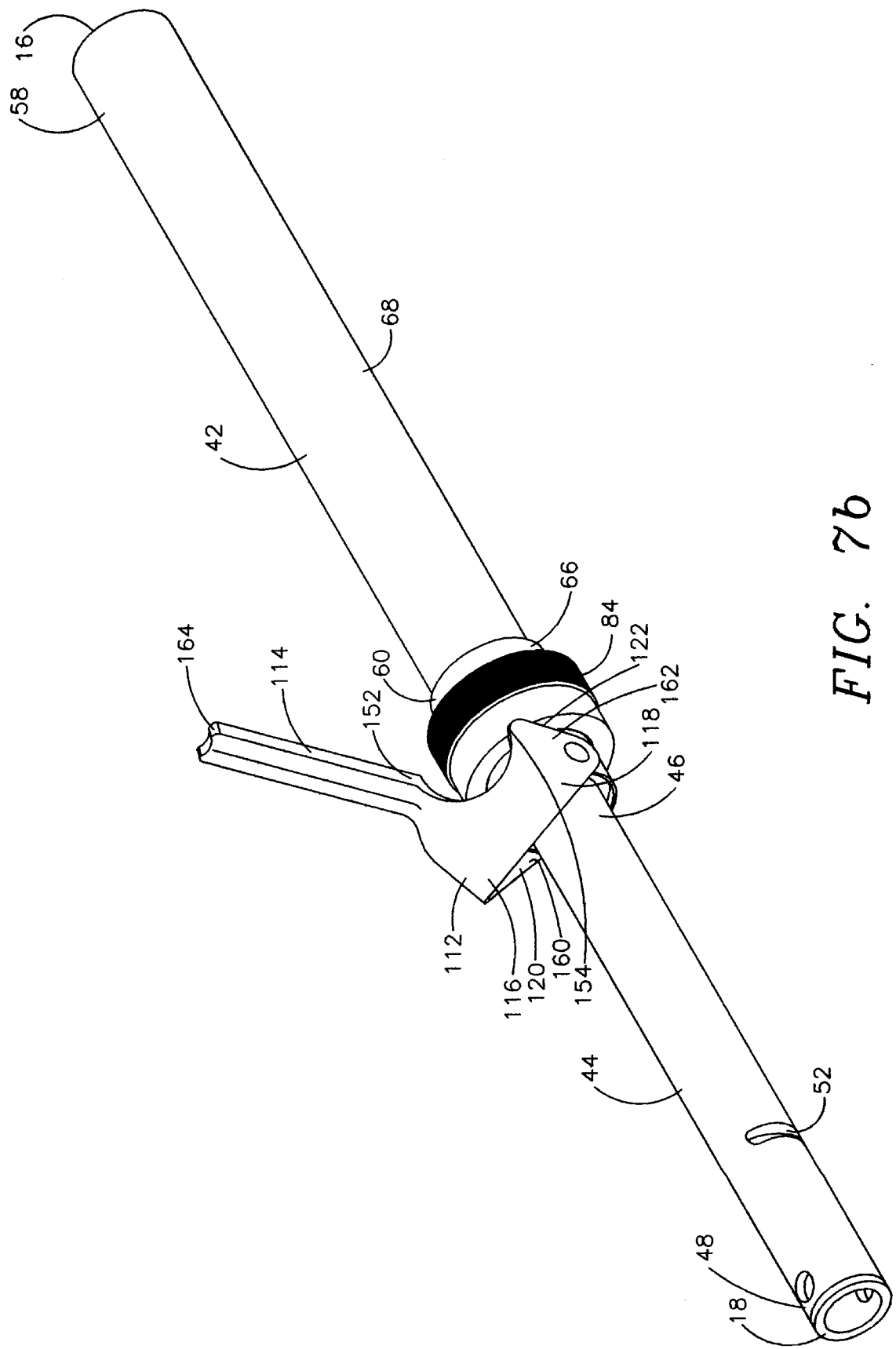
Figure 7C:
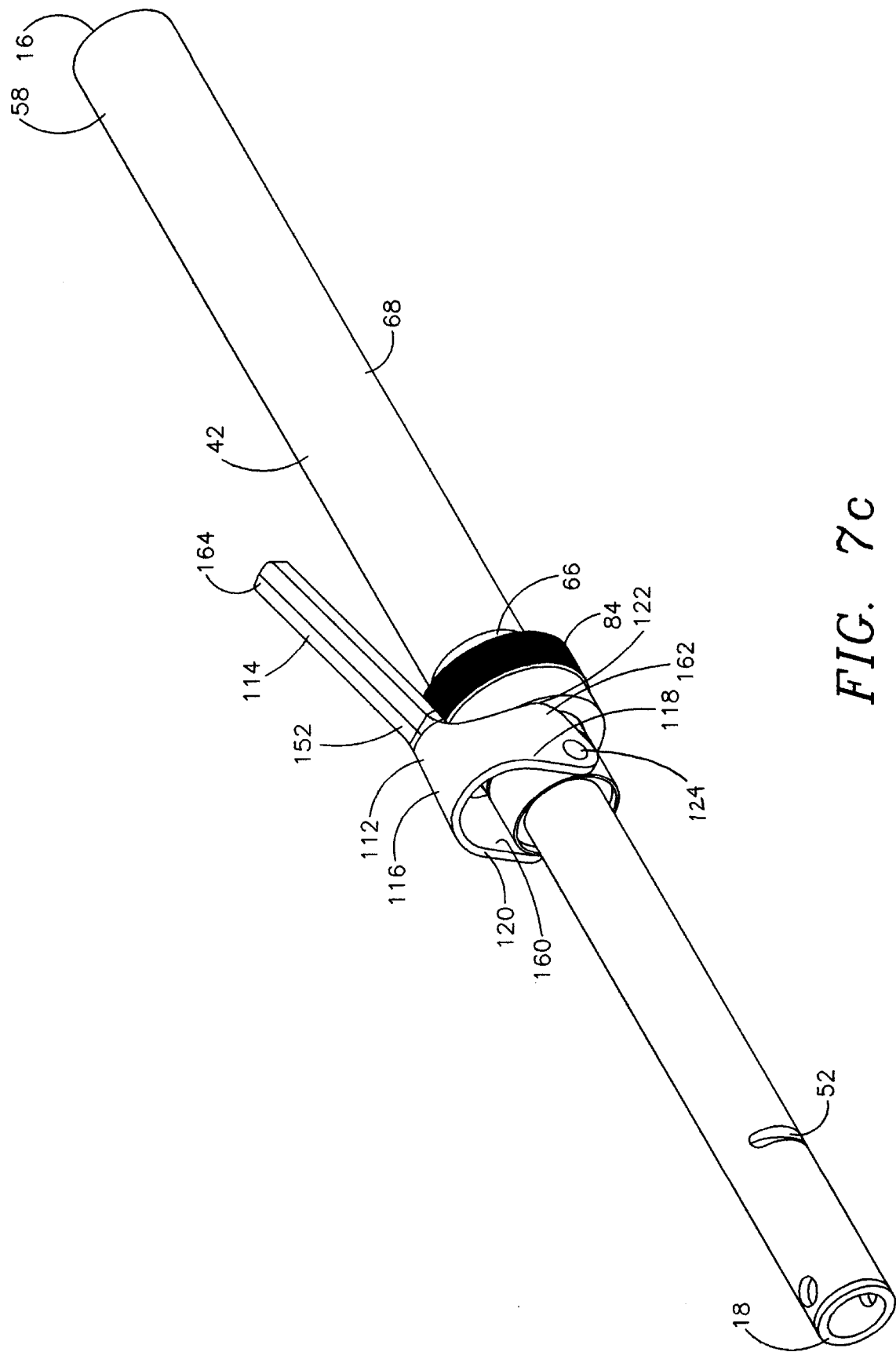

To use the release tool 112, the fulcrum pegs 124 are inserted into the channels 156 with the cam surface 122 proximate to the collar 84 (FIG. 7a). The tool 112 is pushed slightly away from the collar 84 to lock the fulcrum pegs 124 in place in the slots 158. As the handle 114 is pressed downward and toward the collar 84, the release tool 112 rotates about the fulcrum pegs 124. The cam surface 122 engages the collar 84, and forces the collar 84 towards the released position. When the fulcrum pegs 124 are in place in the slots 158 and the cam surface is contacting the collar 84 in the locked position, the second end 164 of the handle 114 is in a locking position (FIG. 7b). When the second end 164 of the handle 114 has been rotated downward and toward the towing arm 10 until the collar 84 is in the released position, the second end 164 of the handle 114 is in a releasing position (FIG. 7c). To move the collar 84 to the released position, the second end 164 of the handle 114 is moved from the locking position to the releasing position (FIGS. 7b–c).

Figure 10:
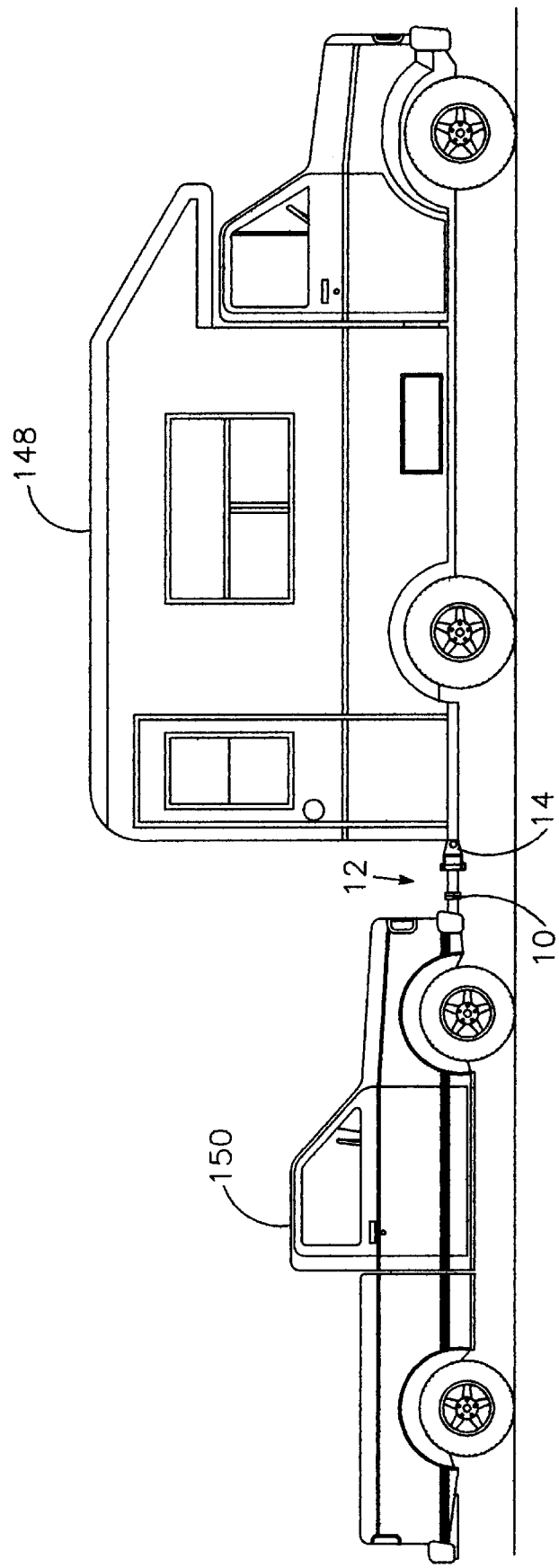
FIG. 10 is an elevational view showing the tow bar assembly of FIG. 1 with the towing arms in an extended position in connection between a towing vehicle and a towed vehicle.

To use the tow bar assembly 12, the male receiver bar 26 is placed in operable connection with the towing vehicle 148. The towed vehicle 150 is moved to approximately two feet from the rear of the towing vehicle 148. The towing arms 10 are extended so that they are substantially parallel with the ground. The collars 84 are moved to the released position, preferably using the release tool 112, and the second leg 44 is slid toward the towed vehicle 150. Once the collars 84 are moved to the released position, and the second legs 44 are slid so that none of their grooves 50, 54 are aligned with the openings 62, 64, the collars 84 will be maintained in the released position by the second legs 44 pressing against the catches 70, 72. The devises 20 can then be attached to the towed vehicle 150 using the attaching dowels 32 and attaching pins 34. The towing vehicle 148 is then slowly pulled forward, thereby pulling the first legs 42 relative to the second legs 44 until the openings 62, 64 are aligned with the first and third grooves 50, 54 and the catches 70, 72 are automatically pushed inward into the grooves 50, 54 by the ramp area 92 of the inner surface 86 of the collar 84 as the collar 84 is urged toward the locked position by the spring 94. The catches 70, 72 will be held in place with the saddle-shaped surfaces 74 engaged with the grooves 50, 54 by the ledge area 88 of the inner surface 86 of the collar 84, and the towing arms 10, 11 will be locked in the extended position for towing (FIG. 10).

The embodiment shown in the drawings is suitable for storage on the towing vehicle 148 when not in use. To move from the operable position in connection between the towing vehicle 148 and the towed vehicle 150 to the storage position, the first step is to set the parking brakes on both the towing vehicle 148 and the towed vehicle 150. Next, any tension or compression in the towing arms 10, 11 is released by using the release tool 112 to move the collars to the release position. The devises 20 can then be unhooked from the towed vehicle 150 by removing the attaching dowels 32 from the apertures 30 in the tongues 28 of the devises 20. The second leg 44 of each towing arm 10, 11 is then moved to the collapsed position (FIG. 11) by moving the collar 84 to the released position, preferably using the release tool 112; then sliding the second leg 44 toward the towing vehicle end 22 of the tow bar assembly 12 until the catches 70, 72 snap into place in the second and fourth grooves 52, 56 as the openings 62, 64 align with those grooves 52, 56, thereby locking the towing arms 10, 11 in the collapsed position.

Once the towing arms 10, 11 are in the collapsed position (FIG. 11), the towing arms 10, 11 are folded together about the horizontal pivot bolt 104. The towing arms 10, 11 and the first yoke 106 are pivoted upward as a unit about the vertical pivot bolt 110 until the towing arms 10, 11 are substantially vertical. The towing arms 10, 11 are then rotated to the side about the horizontal pivot bolt 104 until the towing arms 10, 11 are substantially horizontal. A lockpin 132 attached to one of the towing arms 10 will fit within a hole 134 provided in the second yoke 108. A hairpin clip 136 is inserted in a transverse bore 138 through the lockpin 132 to lock the tow bar assembly 12 in the storage position on the rear of the towing vehicle 148.

It is recommended that the tow bar assembly 12 be disassembled for periodic cleaning and lubricating. The design of the towing arm 10 of the present invention facilitates the easy disassembly and reassembly of the tow bar assembly 12 for cleaning and lubricating. To disassemble one of the towing arms 10 for cleaning and lubricating, pivot both legs 10, 11 to the side with the towing arms 10, 11 more or less horizontal while the tow bar assembly 12 is on the towing vehicle 148. Remove the end cap 146 from the first leg 42. Using a ratchet with an extension, remove the bolt 144, the lockwasher 142, and the stop washer 140 from the second leg 44. Move the collar 84 to the released position using the release tool 112. Extend the second leg approximately half-way out of the first leg 42 to hold the collar 84 in the released position. Remove the snap ring 100 from the second end section 60 of the first leg 42. Slide the second leg 44 out of the first leg 42 until the catches 70, 72 snap into the first and third grooves 50, 54. With the snap ring 100 removed, the collar 84 should slide off the first leg 42. The catches 70, 72 will be exposed and can be removed from the openings 62, 64, and the second leg 44 can be completely slid out of the first leg 42. The lip 78 on the catches 70, 72 is important in the disassembly and reassembly of the towing arms 10, 11 as it prevents the catches 70, 72 from falling into the first legs 42. Similarly, in the embodiment of the catches having the transverse rod 80, the transverse rod retains the catches 70, 72 outside the first leg 42 so that the catches 70, 72 can be removed easily. All parts should be cleaned and inspected. The moving parts should be lightly lubricated before reassembling. To reassemble, the above steps are followed in reverse.

The saddle-shaped surface 74 of the catches 70, 72 of the present invention allow for increased contact area between the catches 70, 72 and the grooves 50, 52, 54, 56 as compared with standard spherical catches. This means that fewer catches 70, 72 are needed to securely lock the towing arms 10 in the extended position. This makes assembly of the towing arm 10 easier, and makes the disassembly and reassembly for maintenance more convenient because fewer parts are involved, and the nonspherical catches 70, 72 of the present invention are less likely to roll away and get lost if dropped. Also, because fewer catches are needed, the grooves 50, 52, 54, 65 need not completely encircle the second leg 44. This means the second leg 44 of the present invention has increased strength.

The foregoing description and drawings merely explain and illustrate preferred embodiments of the invention and the invention is not limited thereto, except insofar as the claims are so limited. Those skilled in the art, who have the disclosure before them, will be able to make modifications and variations therein without departing from the scope of the invention. For example, while it is shown to use the towing arms 10, 11 with a specific coupling, it is contemplated that the towing arms 10, 11 could be used with other couplings and still fall within the scope of the invention.

What is claimed is:

1. A self-locking telescoping towing arm comprising:
   (a) a first leg having a pair of openings;
   (b) a second leg telescopically connected with said first leg, said second leg having a first end and a second end opposite said first end;
   (c) a pair of catches, each of said catches being received through a corresponding one of said openings in said first leg, each of said catches having a saddle-shaped surface;
   (d) a first pair of grooves in said second leg proximate to said first end of said second leg, each of said grooves only partially encircling said second leg;
   (e) a slideable collar received about said first leg and movable relative to said first leg between a locked position and a released position, said collar being capable of holding said saddle-shaped surfaces of said catches in engagement with said first pair of grooves to hold said second leg fixed relative to said first leg such that the towing arm is in an extended position when said collar is in said locked position, and said collar allowing said saddle-shaped surfaces to be released from engagement with said first pair of grooves to allow said second leg to move telescopically relative to said first leg when said collar is in said released position; and
   (f) means for biasing said collar into said locked position.

2. The towing arm of claim 1, further comprising a second pair of grooves in said second leg proximate to said second end of said second leg, said catches holding said towing arm in a collapsed position when said saddle-shaped surfaces of said catches are held in engagement with said second pair of grooves by said collar in said locked position.

3. The towing arm of claim 1, wherein each of said catches has a lip to prevent said catches from passing completely through said openings in said first leg.

4. The towing arm of claim 1, wherein each of said catches has a transverse rod to prevent said catches from passing completely through said openings in said first leg.

5. The towing arm of claim 1, wherein said collar is held in said released position unless said catches are aligned with said first of grooves.

6. The towing arm of claim 5, wherein said collar will automatically move to said locked position when said catches are moved into alignment with said first pair of grooves.

7. A tow bar assembly comprising two of the towing arms of claim 1.

8. The towing arm of claim 1, wherein said collar has an inner surface comprising:
   (a) a ledge area of a reduced diameter for alignment with said openings when said collar is in said locked position to hold said catches in engagement with said first pair of grooves;
   (b) a recessed area of an increased diameter for alignment with said openings when said collar is in said released position to allow said catches to move out of engagement with said first pair of grooves; and
   (c) a ramp area sloping intermediately between said ledge area and said recessed area to press said catches through said openings as said collar moves from said released position to said locked position.

9. A self-locking telescoping towing arm for use in a tow bar assembly, the towing arm comprising:
   (a) a first leg having a first end section and a second end section opposite said first end section, said first end section being suitable for operable connection with a towing vehicle;
   (b) a pair of openings in said second end section of said first leg;
   (c) a second leg telescopically connected with said first leg, said second leg having a first end section and a second end section opposite said first end section, said second end section of said second leg being suitable for operable connection with a towed vehicle;
   (d) a pair of catches, each said catch received through one of said openings in said first leg;
   (e) a first pair of diametrically opposed grooves in said first end section of said second leg, each of said grooves less than completely encircling said second leg;
   (f) a slideable collar received about said first leg and movable relative to said first leg between a locked position and a released position, said collar having a ledge area for maintaining said catches in engagement with said first pair of grooves to hold said second leg fixed relative to said first leg in an extended position when said collar is in said locked position and said openings are aligned with said first groove, and said collar having a recessed area to allow said catches to be released from engagement with said grooves when said collar is in said released position so that said second leg can slide telescopically relative to said first leg; and
   (g) means for biasing said collar into said locked position.

10. The towing arm of claim 9, further comprising a second pair of grooves in said second end section of said second leg, said catches holding said towing arm in a collapsed position when said catches are held in engagement with said second pair of grooves by said collar in said locked position.

11. The towing arm of claim 9, wherein each of said catches has a saddle-shaped surface to engage said grooves.

12. A self-locking telescoping towing arm for use in a tow bar assembly for use in connecting a towed vehicle to a towing vehicle, the towing arm comprising:
   (a) a first leg having a first end section and a second end section opposite from said first end section, said first end section being suitable for operable connection with the towing vehicle;
   (b) a first opening in said second end section of said first leg;
   (c) a second opening in said second end section of said first leg diametrically opposite from said first opening;
   (d) a second leg telescopically received within said first leg, said second leg having a first end section and a second end section opposite from said first end section, said second end section of said second leg being suitable for operable connection with the towed vehicle, said second leg being telescopically adjustable between an extended position and a collapsed position relative to said first leg;
   (e) a first groove in said first end section of said second leg which less than completely encircles said second leg, said first groove aligning with said first opening when said second leg is in said extended position;
   (f) a second groove in said second end section of said first leg which less than completely encircles said second leg, said second groove aligning with said first opening when said second leg is in said collapsed position;

(g) a third groove in said first end section of said second leg which is distinct from and diametrically opposite from said first groove, said third groove aligning with said second opening when said second leg is in said extended position;

(h) a fourth groove in said second end section of said second leg which is distinct from and diametrically opposite from said second groove, said fourth groove aligning with said second opening when said second leg is in said collapsed position;

(i) a first catch received through said first opening in said first leg, said first catch having a first saddle shaped surface;

(j) a second catch received through said second opening in said first leg, said second catch having a second saddle shaped surface;

(k) a slideable collar movable between a locked position and a released position, said collar having an inner surface, said inner surface having a ledge area of a reduced diameter, a recessed area of an increased diameter, and a ramp area sloping intermediately between said ledge area and said recessed area, said ledge area aligning with said first and second openings when said collar is in said locked position to hold said saddle shaped surfaces of said catches against said grooves to maintain said first and second legs in fixed relation to each other, said recessed area aligning with said first and second openings when said collar is in said released position to allow said first and second saddle shaped surfaces of said catches to disengage from said grooves to allow said first and second legs to telescopically slide in relation to each other; and (l) means for biasing said collar into said locked position.

* * * * *